US00RE36124E

United States Patent [19]

Yokoyama et al.

[11] E Patent Number: Re. 36,124

[45] Reissued Date of Patent: Mar. 2, 1999

[54] FIXING APPARATUS

[75] Inventors: Hiroshi Yokoyama; Yutaka Fukuchi, both of Yokohama; Atsushi Arai, Ichikawa; Masahiko Sato, Funabashi; Toshiaki Higaya, Kawasaki; Jun Okamoto, Tokyo, all of Japan

[73] Assignee: Ricoh Company, Ltd., Tokyo, Japan

[21] Appl. No.: 628,270

[22] Filed: Apr. 5, 1996

Related U.S. Patent Documents

Reissue of:

[64] Patent No.: 5,300,996
Issued: Apr. 5, 1994
Appl. No.: 893,050
Filed: Jun. 3, 1992

[30] Foreign Application Priority Data

Jun. 7, 1991 [JP] Japan ..... 3-136478
Jul. 23, 1991 [JP] Japan ..... 3-206448

[51] Int. Cl.[6] ..... G03G 5/20

[52] U.S. Cl. ..... 399/330; 219/216; 219/470; 399/69

[58] Field of Search ..... 355/282, 285, 355/290, 295; 219/216, 469–471; 118/60; 492/46; 399/320, 328, 330, 334, 335, 338, 67, 68, 69

[56] References Cited

U.S. PATENT DOCUMENTS

| | | | |
|---|---|---|---|
| 3,952,798 | 4/1976 | Jacobson et al. | 219/471 X |
| 4,064,933 | 12/1977 | Schuman | 219/469 X |
| 4,229,644 | 10/1980 | Namiki et al. | 219/469 |
| 4,280,263 | 7/1981 | Dean et al. | 118/60 X |
| 4,301,359 | 11/1981 | Ito et al. | 219/469 |
| 4,309,591 | 1/1982 | Ito et al. | 219/469 |
| 4,512,650 | 4/1985 | Kocher | 219/216 X |
| 4,585,325 | 4/1986 | Euler | 355/290 |
| 4,618,240 | 10/1986 | Sakurai et al. | 219/216 |
| 4,736,226 | 4/1988 | Mogi | 219/216 X |
| 4,933,724 | 6/1990 | Sugimoto et al. | 355/285 X |
| 4,942,420 | 7/1990 | Tomizawa et al. | 219/216 X |
| 5,094,613 | 3/1992 | Dolcimascolo et al. | 355/282 X |
| 5,485,260 | 1/1996 | Mitsuya | 355/290 |
| 5,546,173 | 8/1996 | Hinotani et al. | 355/282 |
| 5,561,512 | 10/1996 | Fukano et al. | 355/285 |
| 5,596,397 | 1/1997 | Shimada et al. | 399/335 |

FOREIGN PATENT DOCUMENTS

| | | |
|---|---|---|
| 57-63570 | 4/1982 | Japan . |
| 58-38165 | 3/1983 | Japan . |
| 58-107565 | 6/1983 | Japan . |
| 61-100776 | 5/1986 | Japan . |
| 1-121883 | 5/1989 | Japan . |
| 2-74962 | 3/1990 | Japan . |
| 3-139684 | 6/1991 | Japan . |
| 4-116654 | 4/1992 | Japan . |
| 4-233570 | 8/1992 | Japan . |

*Primary Examiner*—S. Lee
*Attorney, Agent, or Firm*—Oblon, Spivak, McClelland, Maier & Neustadt, P.C.

[57] ABSTRACT

A fixing apparatus for fixing an image on a record sheet [comprises] *includes* a fixing roller in which a heater is disposed, a pressing roller urged against the fixing roller, heat pipes extending in either one of the fixing and pressing rollers in a longitudinal direction thereof, and a temperature detection/control device for detecting [to control] *and controlling* a temperature of the fixing roller. In a typical embodiment, the heat pipes are disposed in the fixing roller to extend both through [an imaging portion] *a sheet passage area*, through which a record sheet passes, and through a [non-imaging portion] *sheet non-passage area*, through which no record sheet passes and the temperature detection/control device has a temperature detection device for detecting a temperature of the fixing roller in contact with the [non-imaging portion] *sheet non-passage area*. The temperature detection/control device is provided with a temperature regulating device for interrupting electricity to the heater when the fixing roller exceeds a predetermined temperature. In another embodiment, at least one of *the* heat pipes is provided in the fixing roller in parallel with an axis of the fixing roller, and a core of the fixing roller is produced by extrusion.

20 Claims, 7 Drawing Sheets

FIXING APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a fixing apparatus of a thermal roller fixing type. More particularly, the invention relates to a fixing apparatus for fixing a toner image on a sheet, which comprises a fixing roller with a heater therein and a pressing roller urged thereagainst.

2. Description of the Related Background Art

Fixation is in general performed using a fixing roller and a pressing roller in a fixing apparatus of image forming apparatus such as electronic copier, printer, or facsimile. The fixing roller is formed by coating a core with a resin like polytetrafluoroethylene (PTFE) such as Teflon (registered trademark) and is provided with a heater inside the core. The pressing roller is urged against the fixing roller to form a nip portion therebetween. A transfer sheet crying a toner image is passed through, the nip portion for fixation. A surface layer of the pressing roller is usually made of an elastic material such as silicone rubber suitable for formation of the nip portion.

A temperature is desirably even in a longitudinal direction of the fixing and pressing rollers. An uneven temperature could cause wrinkles on the transfer sheet, an unfixed portion of image, or offset due to a difference in nipping rising from a difference in thermal expansion between portions different in temperature.

The surface temperature of the fixing roller is detected by a temperature detecting member such as a thermistor in contact with the fixing roller. The heater is controlled to maintain the surface temperature of the fixing roller at a predetermined value based on the detection results. An output distribution of the heater is set non-uniform, because the imaging portion contacting with the record sheet requires a greater quantity of heat than the nonimaging portion not contacting with the record sheet, for thermal transfer to the record sheet.

When the surface temperature of the fixing roller is detected by a temperature detecting member in contact with the imaging portion in a conventional fixing apparatus, a release member thereof made for example of Teflon is abraded by the temperature detecting member to cause incomplete fixation of toner or wrinkles on the record sheet in the abraded part, degrading a quality of image. Further, thermal accumulation tends to take place in the non-imaging portion due to no heat transmission to the record sheet. This thermal accumulation could cause an abnormally high temperature in the non-imaging portion after continuous fixations though the imaging portion is maintained at a predetermined temperature. This results in deformation or melting of the pressing roller urged against the fixing roller.

In contrast, when the surface temperature of the fixing roller is detected by a temperature detecting member in contact with the non-imaging portion in the conventional fixing apparatus, an abnormally high temperature could happen in the imaging portion while keeping a predetermined temperature of the non-imaging portion, because the heater has a higher output in the imaging portion than in the non-imaging portion. This would, also result in deformation or melting of the pressing roller urged against the fixing roller. On the contrary, the temperature in the imaging portion will be reduced below a fixation possible temperature due to thermal transmission to the record sheets in the imaging portion after continuous fixations while maintaining the non-imaging portion at the predetermined temperature, causing incomplete fixation.

Further, thermal leakage takes place in the conventional fixing apparatus through portions in contact with the fixing roller having the heater, for example, bearings, drive gears, and so on, upon start of heating from a cool state of rollers. The thermal leakage lowers a thermal efficiency and a temperature at the ends of the fixing roller, causing incomplete fixation. To prevent the thermal leakage, a fixing apparatus has a thermal insulation bush between the fixing roller and a bearing disposed on a side plate, making the arrangement complicated.

Also, after the fixing apparatus is heated to a stable condition, continuous sheet passage of transfer sheets of small size causes a temperature difference between the sheet passage area and the non-passage area of the roller, resulting in temperature rise in the non-passage area of the roller ends. If a transfer sheet of larger size is passed immediately after the continuous sheet passage of smaller size sheets, there would be caused problems such as incomplete fixation due to the lowered temperature in the sheet passage area of smaller size sheets and offset due to the higher temperature in the non-passage area. The repetition of temperature rise in the roller ends would result in deterioration of fixing and pressing rollers, inevitably shortening their lives.

SUMMARY OF THE INVENTION

It is, therefore, an object of the present invention to provide a fixing apparatus which may keep uniform a surface temperature of the fixing roller and pressing roller in a longitudinal direction thereof.

The object of the present invention can be achieved by a fixing apparatus for fixing an image on a record sheet, comprising a fixing roller in which a heater is disposed; a pressing roller urged against the fixing roller, heat pipe means extending in either one of the fixing and pressing rollers in a longitudinal direction thereof; and temperature detection/control means for detecting to control a temperature of the fixing roller.

This arrangement allows the surface temperature of the fixing and pressing rollers to be maintained uniform.

In an aspect of the present invention, the fixing apparatus is provided with a heat pipe extending in the fixing roller through the imaging portion, through which a record sheet passes, and through the non-imaging portion, through which no record sheet passes, and with temperature detecting means for detecting a temperature of the fixing roller in contact with the non-imaging portion.

Since the heat pipe extends both through the imaging portion and through the non-imaging portion in the fixing roller in such a fixing apparatus, the temperature of fixing roller may be kept substantially constant in the longitudinal direction thereof.

Further, according to such an arrangement, no abrasion of the imaging portion of the fixing roller is caused by the temperature detecting member, the temperature of the imaging portion of the fixing roller may be accurately detected, and an abnormally high temperature may be surely prevented in the fixing roller.

In another aspect of the present invention, the fixing apparatus is provided with temperature detecting means for detecting a temperature of the fixing roller in contact with the non-imaging portion, and with temperature regulating means for interrupting electricity to the heater when the temperature of fixing roller exceeds a predetermined value. It is preferable that the temperature detecting means and the temperature regulating means are in contact with the fixing roller at different positions in the longitudinal direction of the fixing roller.

Specifically, a thermistor as the temperature detecting means is in contact with the non-imaging portion of the fixing roller at a position different from a contact position of a thermostat as the temperature regulating means, in the longitudinal direction of the fixing roller, preventing incomplete fit of the thermistor and thermostat due to flaws on the fixing roller surface, so as to improve the accuracy of temperature detection.

According to this arrangement, no abrasion of the imaging portion of the fixing roller is caused by the temperature detecting member, the temperature of the imaging portion of the fixing roller may be accurately detected, and an abnormally high temperature may be surely prevented in the fixing roller.

It is important to maintain the heat pipe horizontal. Then the main apparatus is designed as to be horizontal upon installation while keeping the fixing apparatus horizontal to the main apparatus. However, if the heat pipe should not be horizontal, an operational liquid in the heat pipe would move towards a lower portion of the heat pipe.

Then in a further aspect of the present invention, at least one heat pipe is in parallel with the axis of the fixing roller and a core of fixing roller holding the heat pipe is produced by extrusion.

Since the at least one heat pipe is in parallel with the axis of the fixing roller, the function of the heat pipe can be fully extracted and the core of the roller supporting the heat pipe may be made by extraction.

The heat pipe parallel to the axis of the fixing roller is horizontal to make full use of its function, and the core produced by extrusion allows an inexpensive fixing roller to be produced.

In a still further aspect of the present invention, the both ends of the fixing roller are made of a material having a low thermal conductivity.

Since the both ends of the fixing roller are made of a material having a low thermal conductivity, the heat leakage may be prevented through the bearings and the gears.

The above arrangement enhances the thermal insulation to reduce thermal transmission from the heater to the side panel or the drive gears, achieving simplification of structure based on power saved, reduction of rise time, and omission of thermal insulation bushes.

In a still further aspect of the present invention, the heat pipe is shorter than the sheet passage area of the fixing roller in the longitudinal direction of the fixing roller, a heating portion of the heater is shorter than the sheet passage area of fixing roller in the longitudinal direction of fixing roller, and the heating portion of the heater is shorter than the heat pipe.

This arrangement uses the heat pipe of appropriate length to keep the fixing roller surface temperature in the sheet passage area in a proper range.

Since the lengths of the heat pipe and heater are properly defined, the fixing roller ends may be prevented from having an abnormally high temperature, saving the power.

The above arrangement achieved reduction of power for the heater, prevention of abnormal temperature rise in the non-sheet passage area of the fixing roller upon continuous sheet passage of transfer sheets of smaller size, and therefore extension of life of fixing and pressing rollers.

In a still further aspect of the present invention, at least one heat pipe is disposed in the pressing roller, the heat pipe is held on the core of the pressing roller, and at least a portion of the heat pipe is located in an elastic layer of the pressing roller.

The heat pipe disposed in the elastic layer of the pressing roller helps maintain temperature uniformity of the pressing and fixing rollers in the longitudinal direction thereof.

In a still further aspect of the present invention, at least one heat pipe is located inside the elastic layer of the pressing roller.

Since the heat pipe is inside the elastic layer, the temperature uniformity may be effectively achieved preventing temperature rise in the non-sheet passage area as well as wrinkles of the transfer sheet.

Further objects and advantages of the present invention will be apparent from the following description of the preferred embodiments of the invention as illustrated in the accompanying drawings.

DESCRIPTION OF THE PREFERRED EMBODIMENTS

There will be below explained with reference to the accompanying drawings embodiments of fixing a apparatus according to the present invention.

Figure 1:
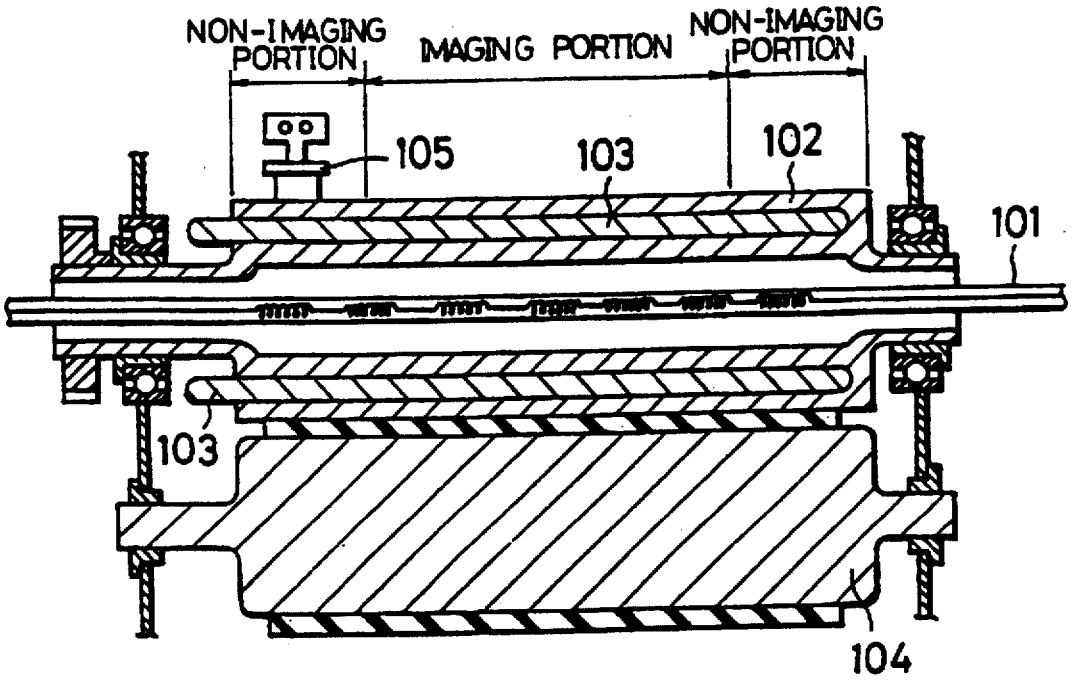
FIG. 1 is a sectional view to show a schematic structure of a first embodiment of fixing apparatus according to the present invention.

FIG. 1 shows a schematic sectional view of a fixing apparatus of fast embodiment, which comprises a fixing roller 102 with a heater 101 such as a Xenon lamp therein, heat pipes 103 of stick disposed inside a core of fixing roller 102, a pressing roller 104 disposed adjacent to the fixing roller 102, and a thermistor [106] *105* disposed as a temperature detection member in contact with a non-imaging portion of fixing roller 102. A surface of the fixing roller 102 is formed of Teflon, and a surface of the pressing roller 104 of silicone rubber.

An operation is next explained in the above arrangement. The thermistor 105 detects a surface temperature of the fixing roller 102 to maintain the surface temperature at a predetermined temperature or fixing temperature by on-off control of the heater 101 based on the detection results. The pressing roller 104 adjacent to the fixing roller 102 is urged against the fixing roller 102 by an unrepresented pressing spring, and thereby a nip is formed between the fixing roller 102 and the pressing roller 104 with a constant pressure. A record sheet carrying a toner image is passed through the nip to be heated and pressed, whereby the toner image is fixed on the record sheet.

The heat pipes 103 are explained below. The heat pipes 103 extend in the fixing roller 102 both through the imaging portion and through the non-imaging portion of the fixing roller 102. The heat pipes 103 are of hollow cylinder made of copper. A predetermined amount of water is sealed in the hollow of each heat pipe 103. While the fixing apparatus is operated, the sealed water is heated by the heater 101 to become water vapor.

Figure 2:
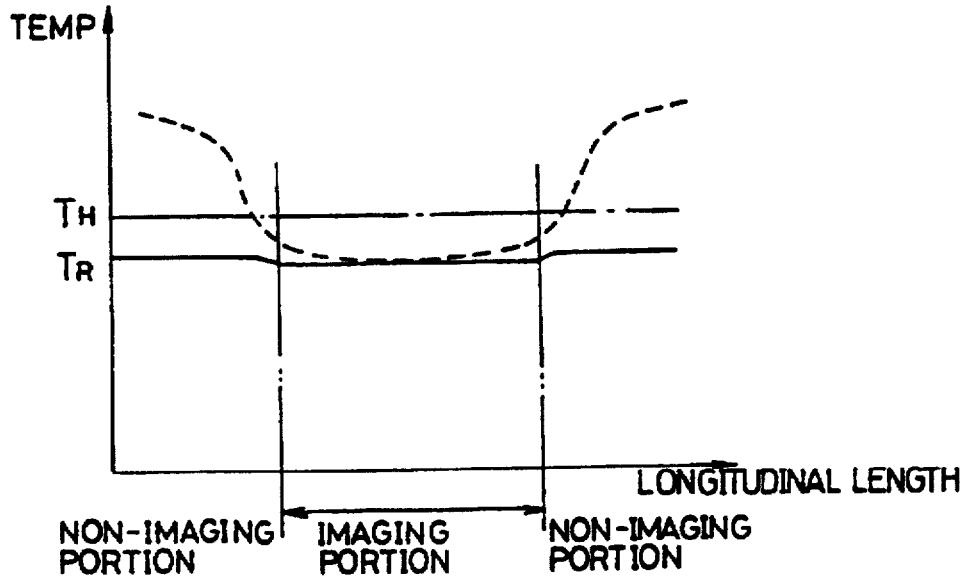
FIG. 2 is a drawing to illustrate temperature gradients of a fixing roller surface temperature in a longitudinal direction of the fixing roller in the first embodiment of the present invention.

FIG. 2 is a drawing to illustrate surface temperatures of the fixing roller 102 in the longitudinal direction of the fixing roller 102 after continuous fixation processes. In FIG. 2, a solid line represents a surface temperature of the fixing roller 102, an alternate long and short dash line a temperature of the heat pipe 103 and a broken line a surface temperature of fixing roller without any heat pipe. As shown, a greater temperature gradient is seen in the longitudinal direction on the surface of fixing roller without any heat pipe after continuous fixation processes. This teaches that an abnormally high temperature could appear in the non-imaging portion if the temperature detection is conducted at the imaging portion, or that the temperature of imaging portion could decrease below the fixing temperature if the temperature detection is conducted at the non-imaging portion.

In contrast, a temperature $T_H$ of heat pipe 103 as shown by the alternate long and short dash line is constant without temperature gradient in the longitudinal direction. This is because a molecular speed of water vapor is higher at a high temperature to cause fast thermal diffusion so as to cancel the temperature gradient generated in the heat pipe 103. Then, when the heat pipes 103 are provided in the fixing roller 102, the surface temperature of the fixing roller 102 as shown by the solid line shows only a slight temperature gradient around borders between the imaging portion and the non-imaging portion. In other words, the temperature of the imaging portion may be accurately detected by the thermistor 105 in contact with the non-imaging portion, because there is few difference of temperature $T_R$ detected at the non-imaging portion from the temperature of the imaging portion. Such smaller longitudinal temperature gradient difference on the fixing roller 102 can avoid in abnormally high temperature localized in the fixing roller 102, improving the safety of the apparatus.

Figure 3:
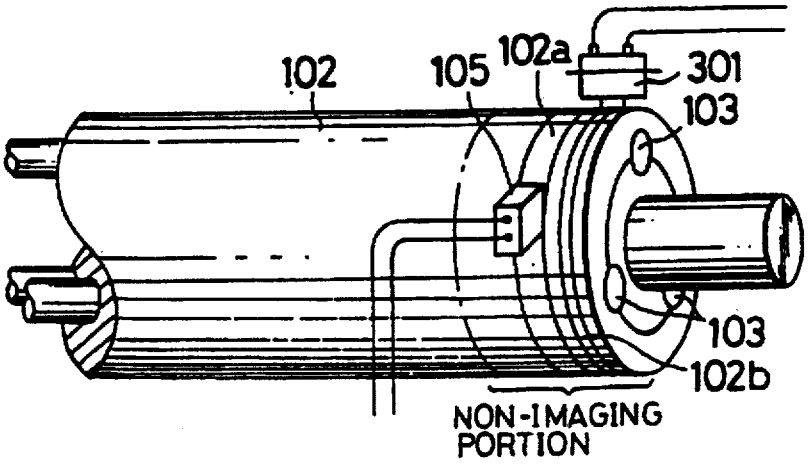
FIG. 3 is a drawing to show a structure of a non-imaging portion of a fixing roller in a second embodiment according to the present invention.

FIG. 3 shows a non-imaging port of fixing roller 102 in a second embodiment of the fixing apparatus. In the second embodiment as shown in FIG. 3, a thermistor 105 is in contact with a portion 102a of the non-imaging portion of the fixing roller 102, and a thermostat 301 with a portion 102b of the non-imaging portion of the fixing roller 102. Three heat pipes 103 are provided in the fixing roller 102. The heat pipes 103 extend both through the imaging portion and through the non-imaging portion of the fixing roller 102 as shown in FIG. 3. As being the case in the first embodiment, such an arrangement allows accurate detection of temperature of imaging portion and prevention of abnormally high temperature of the fixing roller 102, improving the safety of the apparatus.

In the second embodiment as shown in FIG. 3, the thermistor 105 is in contact with the fixing roller 102 at a position offset from the contact position of thermostat 301 in the longitudinal direction thereof. The surface of the fixing roller 102 is abraded possibly by the contact with the thermistor 105 and the thermostat 301. If the thermistor 105 is in contact with the fixing roller 102 at the same longitudinal position as the thermostat 301, the thermistor 105 would not be in sufficient contact with the fixing roller 102 depending on conditions of abrasion of surface of the fixing roller 102, causing inaccurate detection of temperature. Therefore, the offset arrangement of thermistor 105 and thermostat 301 may prevent such inaccurate detection of temperature. The thermostat 301 interrupts electricity to the heater 101 when the surface temperature of the fixing roller 102 exceeds a predetermined temperature, so that the fixing roller 102 may be prevented from having an abnormally high temperature due to a trouble for example in the thermistor 105 or in a control system.

A third embodiment of fixing apparatus according to the present invention is next explained with reference to FIGS. 4 and 5.

Figure 4:
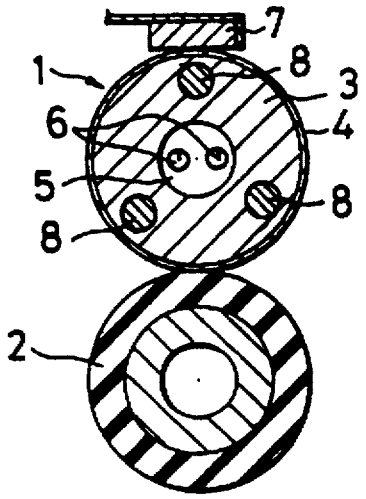
FIG. 4 is a transverse sectional view to show a third embodiment of the fixing apparatus according to the present invention.
Figure 5:
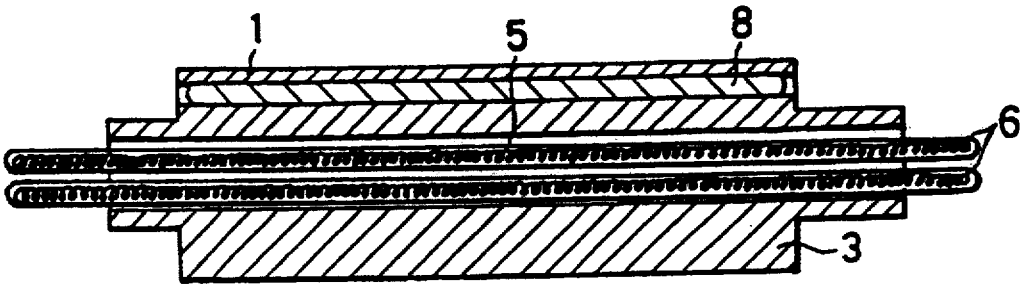
FIG. 5 is a longitudinal sectional direction of the fixing roller as shown in FIG. 4.

A fixing roller 1 and a pressing roller 2 are urged against each other in the fixing apparatus as shown in FIG. 4. The fixing roller 1 has a core 3 and a release layer 4 made for example of Teflon. Heaters 6 are provided in longitudinal central hollow 5 of core 3 as shown in FIG. 5. A thermistor 7 detects a surface temperature of the fixing roller 1 to maintain the temperature constant for example between 158° and 170° C. by on-off control of the heater 6. A plurality of beat pipes 8 are imbedded in the core 3. The heat pipes 8 are disposed in parallel with an axis of the fixing roller 1. The core 3 is produced by extrusion. Insertion holes for the heat pipes 8 may be simultaneously formed, upon the extrusion, because the heat pipes 8 are in parallel with the axis of fixing roller 2.

Figure 6:
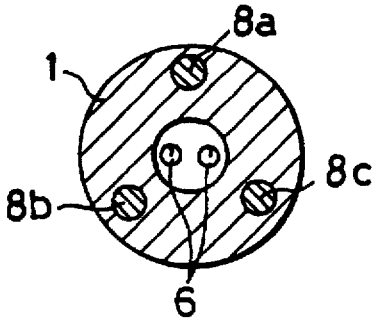
FIG. 6 is a transverse sectional view of a fixing roller in a fourth embodiment according to the present invention.
Figure 7:
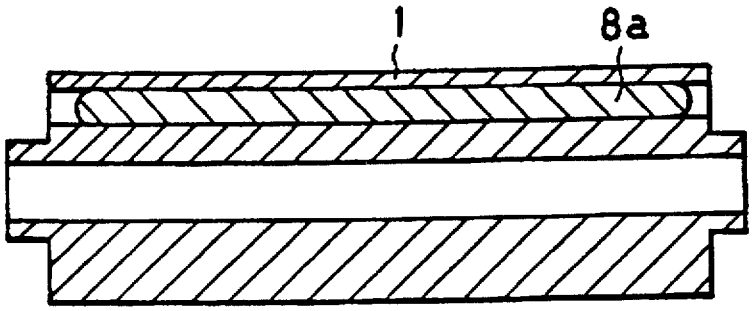
FIG. 7 is a longitudinal sectional view of the fixing roller as shown in FIG. 6.
Figure 8:
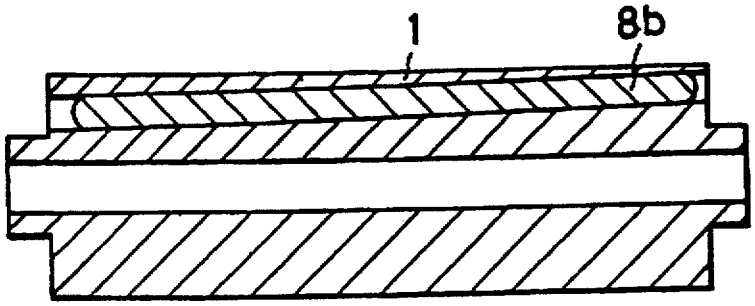
FIG. 8 is a longitudinal sectional view of the fixing roller as shown in FIG. 6 along another diameter of the fixing roller.
Figure 9:
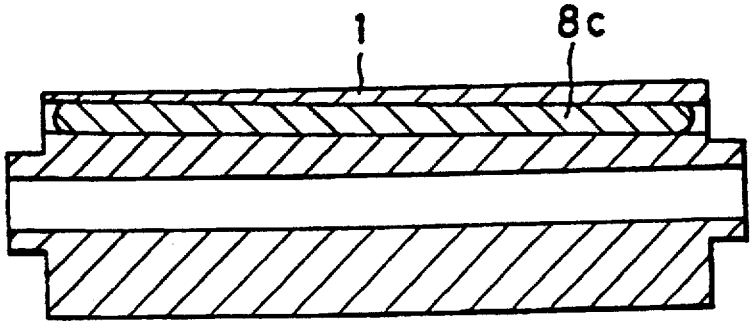
FIG. 9 is a longitudinal sectional view of the fixing roller as shown in FIG. 6 along still another diameter of the fixing roller.

FIG. 6 shows a fourth embodiment of the fixing apparatus according to the present invention. In the fourth embodiment as shown in FIG. 6, there are provided three heat pipes 8a, 8b, 8c in a fixing roller 1, the heat pipe 8a being in parallel with an axis of the fixing roller 1 as shown in FIG. 7, and the heat pipes 8b, 8c being inclined with respective slants opposite to each other with respect to the axis as shown in FIGS. 8 and 9. Such an arrangement allows either of the heat pipes to be horizontal independent of installation conditions of the main apparatus. In detail, if the main apparatus is installed horizontally, the heat pipe 8a is horizontal. If the main apparatus is installed such that the left end of the fixing roller 1 is higher in the drawings, the heat pipe 8b is horizontal. On the contrary, if the light end is higher, the heat pipe 8c is horizontal. The slants of heat pipes 8b, 8c should be within 10 degrees. If the main apparatus is inclined at an angle over ten degrees, other problems would occur such as oil leakage, or density unevenness due to biased developer. In the above arrangement, the two heat pipes not horizontal may serve as heat pipe though not fully 100%.

The core of the fixing roller as shown in FIGS. 6–9 is produced by extrusion with a hole for the heat pipe 8a, and two holes are processed to be inclined with respect to the axis of the fixing roller. This processing is disadvantageous as compared to the third embodiment as shown in FIGS. 4 and 5. However, the arrangement of the fourth embodiment is advantageous in case of inclined installation of the main apparatus while keeping at least one heat pipe horizontal. Since most main apparatus are considered to be approximately horizontally installed, at least one heat pipe should be in parallel with the axis of the fixing roller.

Explained in the following is an embodiment enabling reduction of thermal leakage through bearings and drive gears, comparing with a conventional apparatus.

Figure 16:
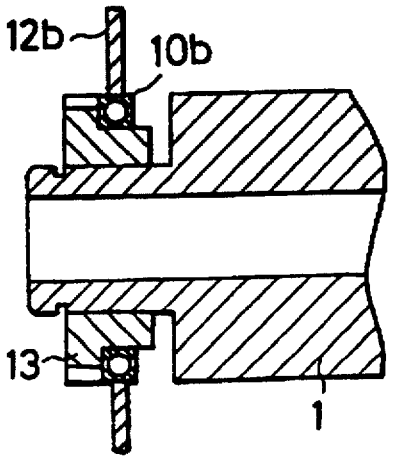
FIG. 16 is a partially sectional view to show a conventional thermal installation support mechanism of the fixing roller.

In the conventional fixing apparatus, as described before, thermal leakage takes place in the conventional fixing apparatus through portions in contact with the fixing roller having the heater, for example, bearings, drive gears, and so on, upon start of heating from a cool state of rollers. The thermal leakage lowers a thermal efficiency and a temperature at ends of the fixing roller, causing incomplete fixation. To prevent the thermal leakage, a fixing apparatus has a thermal insulation bush 13 between a fixing roller 1 and a bearing 10b disposed on a side plate 12b as shown in FIG. 16, making the arrangement complicated.

The fifth embodiment of the fixing apparatus according to the present invention achieved the reduction of thermal leakage by members with a low thermal conductivity disposed on the both ends of a core. The fifth embodiment is further explained below with reference to FIG. 10.

Figure 10:
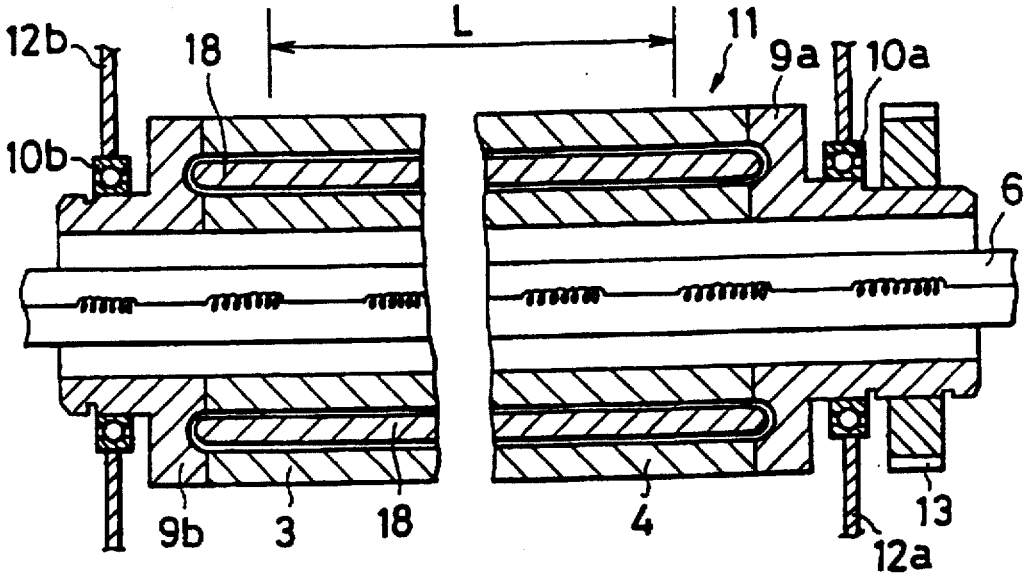
FIG. 10 is a longitudinal sectional view of a fixing roller in a fifth embodiment according to the present invention.

A fixing roller 11 as shown in FIG. 10 is different from that in the preceding embodiments in that flanges 9a, 9b made for example of a resin with a low thermal conductivity are fixed to the both ends of core 3 which has a higher thermal conductivity. A heat pipe 18 is longer than a sheet passage area L. The fixing roller 11 is rotatably mounted on side plates 12a, 12b through bearings 10a, 10b provided on the flanges 9a, 9b. The fixing roller 11 is driven to rotate through a gear 13.

Since the flanges 9a, 9b with the low thermal conductivity are located at the both ends of a core 3, heat leakage may be effectively prevented through the bearings 10a, 10b and the gear 13, properly keeping the temperature of sheet passage area L. In this arrangement, the uniformity of temperature may be maintained by the heat pipes 18 greater in heat transfer, relaxing the temperature difference in the fixing roller 11.

Figure 11:
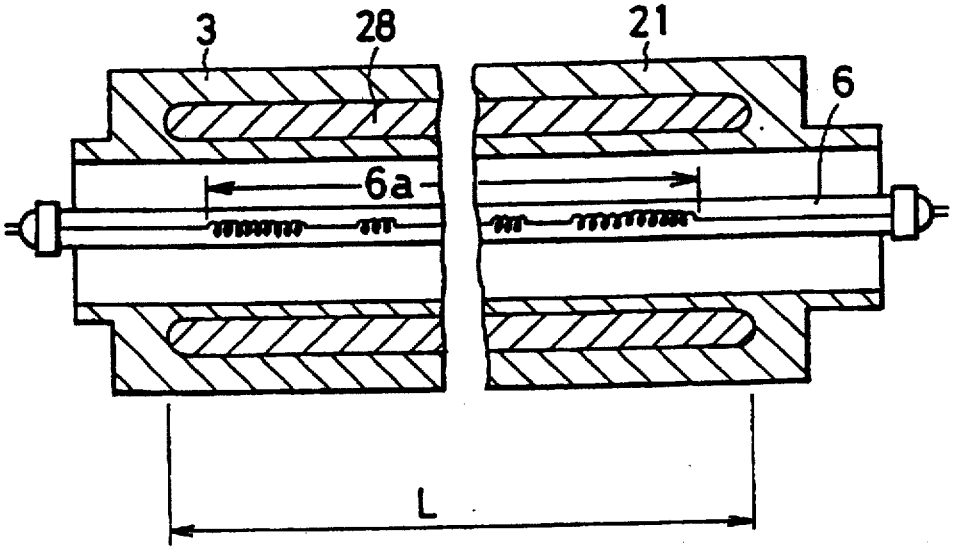
FIG. 11 is a longitudinal sectional view of a fixing roller in a sixth embodiment according to the present invention.

FIG. 11 shows a sixth embodiment of the fixing apparatus according to the present invention.

In FIG. 11, heat pipes 28 are disposed in a fixing roller 21 in a longitudinal direction thereof. The heat pipes 28 are shorter than the maximum sheet passage area L. Further, a heating portion 6a of heater 6 is also shorter than the maximum sheet passage area L and than the heat pipes 28 in the longitudinal direction of the fixing roller 21.

Figure 12:
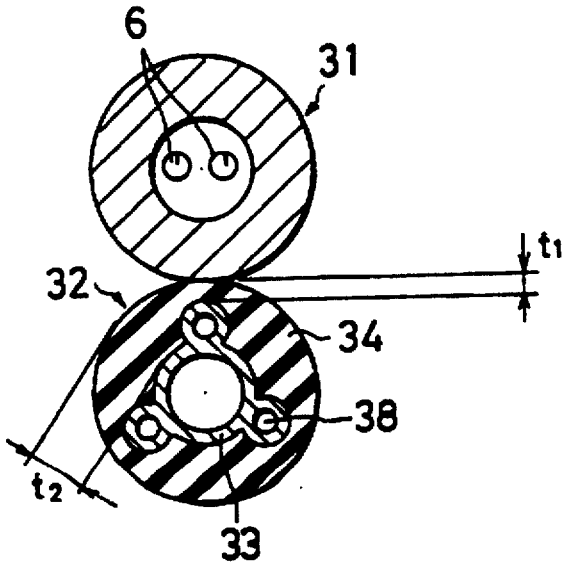
FIG. 12 is a transverse sectional view to show a seventh embodiment of a fixing apparatus according to the present invention.
Figure 13:
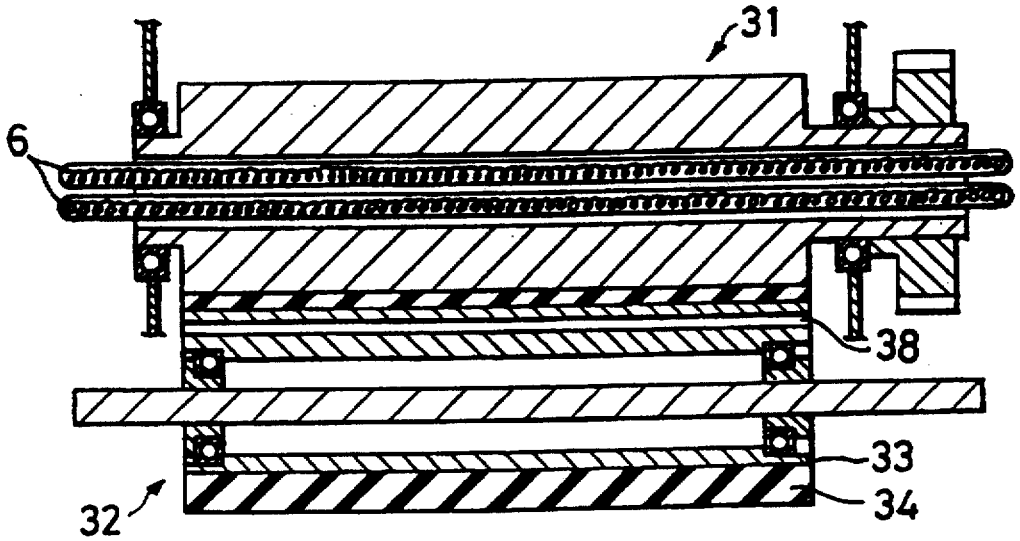
FIG. 13 is a longitudinal sectional view of the fixing apparatus as shown in FIG. 12.

FIGS. 12 and 13 show a seventh embodiment of the fixing apparatus according to the present invention. In the fixing apparatus as shown in FIGS. 12 and 13, a fixing roller 31 is provided with halogen heaters 6 in a central hollow thereof, and a pressing roller 32 is composed of a core 33 of rigid body such as a metal and of an elastic layer 34 of silicone rubber. Heat pipes 38 are integrally held on the core 33. In detail, a portion of each heat pipe 38 is projected from the core 33 into the elastic layer 34. A distance t 1 should be carefully determined so as not to be too short between the heat pipes 38 and the surface of the elastic layer 34. If there is a great difference between the distance t1 and thickness t2 of elastic layer 34 in a non-projecting portion of the core 33, nip would differ depending on a position between the pressing roller 32 and the fixing roller 31, causing a fixation difference on a transfer sheet passed through the nip.

Figure 14:
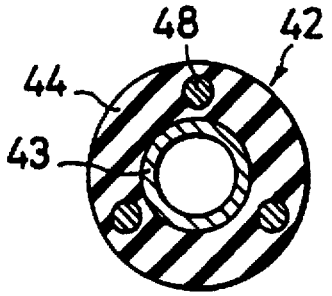
FIG. 14 is a transverse sectional view of a pressing roller in an eighth embodiment according to the present invention.

FIG. 14 shows an eighth embodiment of the present invention.

In a pressing roller 42 as shown in FIG. 14, heat pipes 48 are imbedded in an elastic layer 44, independent of a core 43. In this arrangement, the core 43 may be formed in a cylindrical shape, which is easier in production as compared to the embodiment as shown in FIGS. 12 and 13. This arrangement also has less limitations to a material of the core 43. Therefore, the fixing apparatus may be produced for a cheaper cost. Further, since the heat pipes 48 are separate from the core 43, the heat pipes 48 have a greater effect to maintain the temperature of elastic layer 44 uniform.

Figure 15:
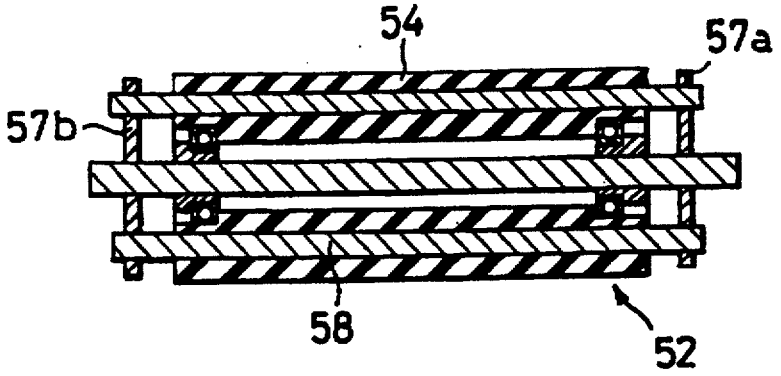
FIG. 15 is a longitudinal sectional view to show a modification of the pressing roller as shown in FIG. 14.

FIG. 15 shows a modification of the embodiment as shown in FIG. 14.

In the modification as shown in FIG. 15, the heat pipes 58 are imbedded in an elastic layer 54 of pressing roller 52 in the same manner as in the embodiment as shown in FIG. 14, but the heat pipes 58 are supported by support plates 57a, 57b outside the both ends of pressing roller.

Many widely different embodiments of the present invention may be constructed without departing from the spirit and scope of the present invention. It should be understood that the present invention is not limited to the specific embodiments described in the specification, except as defined in the appended claims.

What is claimed is:

1. A fixing apparatus for fixing an image on a record sheet, comprising:

a tubular fixing roller;

a pressing roller urged against said fixing roller;

a heater received in said fixing roller for heating said fixing roller;

at least one heat pipe embedded in said fixing roller so as to extend in a longitudinal direction of said fixing roller for improving a thermal conductivity; and temperature detection/control means for detecting a temperature of said fixing roller and controlling said heater so as to adjust said temperature of said fixing roller based on said detected temperature[; 'said fixing roller having an imaging portion at a center thereof and having non-imaging portions at both ends thereof, and], said *at least one* heat pipe being disposed in said fixing roller so as to extend, *at least at one end thereof, over a sheet passage area and a sheet non-passage area on said fixing roller,* [through said imaging portion and said non-imaging portions,] said temperature detection/control means [comprising temperature detection means for detecting said temperature of said fixing roller at said non-imaging portion, said temperature detection/control means comprising temperature regulating means for interrupting electricity to said heater when said fixing roller exceeds a predetermined temperature, said temperature detecting means and said temperature regulating means being in contact with said fixing roller at different positions which are offset in the longitudinal direction of said fixing roller] *being arranged in said sheet non-passage area in which said at least one heat pipe is disposed.*

2. A fixing apparatus according to claim 1, wherein said *at least one* heat pipe is at least three in number, and at least one of said heat pipes is in parallel with [the] *a* longitudinal axis of said fixing roller.

[3. A fixing apparatus according to claim 1, wherein said heat pipe is embedded in a core of said fixing roller, and said core of said fixing roller is produced by extrusion.]

4. A fixing apparatus [according to claim 1, wherein] *for fixing an image on a record sheet, comprising:*

*a tubular fixing roller;*

*a pressing roller urged against said fixing roller;*

*a heater received in said fixing roller for heating said fixing roller;*

*at least one heat pipe embedded in said fixing roller so as to extend in a longitudinal direction of said fixing roller for improving a thermal conductivity; and*

*temperature detection/control means for detecting a temperature of said fixing roller and controlling said heater so as to adjust said temperature of said fixing roller based on said detected temperature,*

*said at least one heat pipe being disposed in said fixing roller so as to extend, at least at one end thereof, over a sheet passage area and a sheet non-passage area on said fixing roller,* both ends of said fixing roller [are] *being* made of a material having a low thermal conductivity.

5. A fixing apparatus according to claim 1, wherein said pipe is shorter in the longitudinal direction of said fixing roller than [a] *the* sheet passage area of said fixing roller.

6. A fixing apparatus according to claim 1, wherein a heating portion of said heater is shorter in [a] *the* longitudinal direction of said fixing roller than [a] *the* sheet passage area of said fixing roller.

7. A fixing apparatus according to claim [6] *15*, wherein said heating portion of said heater is shorter than said heat pipe.

8. A fixing apparatus according to claim 1, wherein said *at least one* heat pipe is at least three in number, and at least one of said heat pipes is embedded in an elastic layer of said pressing roller.

9. A fixing apparatus according to claim 2, wherein all of said heat pipes are provided in parallel with the longitudinal axis of said fixing roller.

10. A fixing apparatus according to claim 2, wherein one of said heat pipes is in parallel with said longitudinal axis of said fixing roller, and the others of said heat pipes are oblique with respect to said longitudinal axis of said fixing roller.

11. A fixing apparatus according to claim 8, wherein said heat pipes are supported by support means outside said elastic layer.

12. A fixing apparatus for fixing an image on a record sheet, comprising:

a tubular fixing roller;

a pressing roller urged against said fixing roller;

a heater received in said fixing roller for heating said fixing roller;

[at least one heat pipe embedded in a core of said pressing roller so as to extend in a longitudinal direction of said pressing roller for improving a thermal conductivity, at least a portion of said heat pipe being in an elastic layer of said pressing roller,]; and temperature detection/control means for detecting a temperature of said fixing roller and controlling said heater so as to adjust said temperature of said fixing roller based on said detected temperature[;] 'said fixing roller having [an imaging portion at a center thereof and having non-imaging portions at both ends thereof, and said heat pipe being disposed in said pressing roller so as to extend through said imaging portion and said non-imaging portions, said temperature detection/control means comprising temperature detection means for detecting said temperature of said fixing roller at said non-imaging portion, said temperature detection/control means comprising temperature regulating means for interrupting electricity to said heater when said fixing roller exceeds a predetermined temperature, said temperature detecting means and said temperature regulating means being in contact with said fixing roller at different positions which are offset in the longitudinal direction of said fixing roller] *a sheet passage area and a sheet non-passage area thereon, said fixing apparatus further comprising at least one heat pipe held on a core of said pressing roller so as to extend in a longitudinal direction of said pressing roller for improving a thermal conductivity, at least a portion of said at least one heat pipe being in an elastic layer of said pressing roller, and said at least one heat pipe being disposed in said pressing roller so as to extend over said sheet passage area and said sheet non-passage area.*

13. A fixing apparatus [according to claim 12, wherein] *for fixing an image on a record sheet, comprising:*

*a tubular fixing roller;*

*a pressing roller urged against said fixing roller;*

*a heater received in said fixing roller for heating said fixing roller; and*

*temperature detection/control means for detecting a temperature of said fixing roller and controlling said heater so as to adjust said temperature of said fixing roller based on said detected temperature,*

*said fixing roller having a sheet passage area and a sheet non-passage area thereon,*

*said fixing apparatus further comprising at least one heat pipe held on a core of said pressing roller so as to extend in a longitudinal direction of said pressing roller for improving a thermal conductivity, at least a portion of said at least one heat pipe being in an elastic layer of said pressing roller, and said at least one heat pipe being disposed in said pressing roller so as to extend over said sheet passage area and said sheet non-passage area,* said *at least one* heat pipe [is] *being* formed in an integral with said core.

*14. A fixing apparatus for fixing an image on a record sheet, comprising:*

*a tubular fixing roller;*

*a pressing roller urged against said fixing roller;*

*a heater received in said fixing roller for heating said fixing roller; and*

*at least one heat pipe embedded in said fixing roller so as to extend in a longitudinal direction of said fixing roller for improving a thermal conductivity,*

*said at least one heat pipe being disposed in said fixing roller so as to extend, at least at one end thereof, over*

*a sheet passage area and a sheet non-passage area for a small size sheet on said fixing roller and within a sheet passage area for a maximum size sheet on the fixing roller.*

*15. A fixing apparatus for fixing an image on a record sheet, comprising:*

*a tubular fixing roller;*

*a pressing roller urged against said fixing roller;*

*a heater received in said fixing roller for heating said fixing roller; and*

*at least one heat pipe embedded in said fixing roller so as to extend in a longitudinal direction of said fixing roller for improving a thermal conductivity,*

*wherein a heating portion of said heater extends within a sheet passage area for a maximum size sheet on the fixing roller.*

*16. A fixing apparatus according to claim 1, wherein said temperature detection/control means comprises temperature detection means for detecting said temperature of said fixing roller at said sheet non-passage area and temperature regulating means for interrupting electricity to said heater when said fixing roller exceeds a predetermined temperature, said temperature detection means and said temperature regulating means are arranged in different portions which are offset in the longitudinal direction of said fixing roller.*

*17. A fixing apparatus according to claim 14, wherein a heating portion of said heater is shorter than said heat pipe.*

*18. A fixing roller for fixing an image on a record sheet, comprising:*

*a tubular roller body; and*

*at least one heat pipe embedded in said roller body so as to extend in a longitudinal direction of said roller body for improving a thermal conductivity,*

*said at least one heat pipe being disposed in said roller body so as to extend, at least at one end thereof, over a sheet passage area and a sheet non-passage area on said roller body, thereby to allow an arrangement of a temperature detection/control means within said sheet non-passage area.*

*19. A fixing roller for fixing an image on a record sheet, comprising:*

*a tubular roller body; and*

*at least one heat pipe embedded in said roller body so as to extend in a longitudinal direction of said roller body for improving thermal conductivity,*

*said at least one heat pipe being disposed in said roller body so as to extend, at least at one end thereof, over a sheet passage area and a sheet non-passage area on said roller body,*

*both ends of said roller body being made of a material having a low thermal conductivity.*

*20. A fixing roller for fixing an image on a record sheet, comprising:*

*a tubular roller body; and*

*at least one heat pipe embedded in said roller body so as to extend in a longitudinal direction of said roller body for improving a thermal conductivity,*

*said at least one heat pipe being disposed in said roller body so as to extend, at least at one end thereof, over a sheet passage area and a sheet non-passage area for a small size sheet on said roller body and within a sheet passage area for a maximum size sheet on the roller body.*

*21. A fixing roller for fixing an image on a record sheet, comprising:*

*a tubular roller body;*

*a heater received in said roller body for heating said roller body; and*

*at least one heat pipe embedded in said roller body so as to extend in a longitudinal direction of said roller body for improving a thermal conductivity,*

*wherein a heating portion of said heater extends within a sheet passage area for a maximum size sheet on the roller body.*

* * * * *